(12) United States Patent
Tsuboi et al.

(10) Patent No.: US 6,460,650 B2
(45) Date of Patent: Oct. 8, 2002

(54) ELECTRIC POWER STEERING APPARATUS HAVING AN ELASTIC TORQUE TRANSMISSION BODY

(75) Inventors: Yoshitaka Tsuboi, Tochigi (JP); Hiroshi Fujita, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/792,922

(22) Filed: Feb. 26, 2001

(65) Prior Publication Data

US 2001/0035310 A1 Nov. 1, 2001

(30) Foreign Application Priority Data

Apr. 25, 2000 (JP) .......................... 2000-124911

(51) Int. Cl.[7] .............................................. F16H 55/14
(52) U.S. Cl. .......................................... 180/444; 74/411
(58) Field of Search ................................ 180/444, 443, 180/412, 413, 400; 74/388 PS, 458, 724, 640, 409, 411, 440, 490

(56) References Cited

U.S. PATENT DOCUMENTS

| | | | | |
|---|---|---|---|---|
| 4,416,345 A | * | 11/1983 | Barthelemy | 180/444 |
| 4,667,759 A | * | 5/1987 | Hashimoto et al. | 180/444 |
| 4,784,234 A | * | 11/1988 | Naito et al. | 180/444 |
| 5,213,173 A | * | 5/1993 | Konishi et al. | 180/444 |
| 6,026,925 A | * | 2/2000 | Nagao et al. | 180/444 |

FOREIGN PATENT DOCUMENTS

JP 11198829 7/1999

* cited by examiner

*Primary Examiner*—F. Zeender
(74) *Attorney, Agent, or Firm*—Orum & Ruth

(57) ABSTRACT

In an electric power steering apparatus, a torque transmission body made of an elastic body is interposed between an output shaft of an electric motor and a drive shaft of a drive gear.

5 Claims, 4 Drawing Sheets

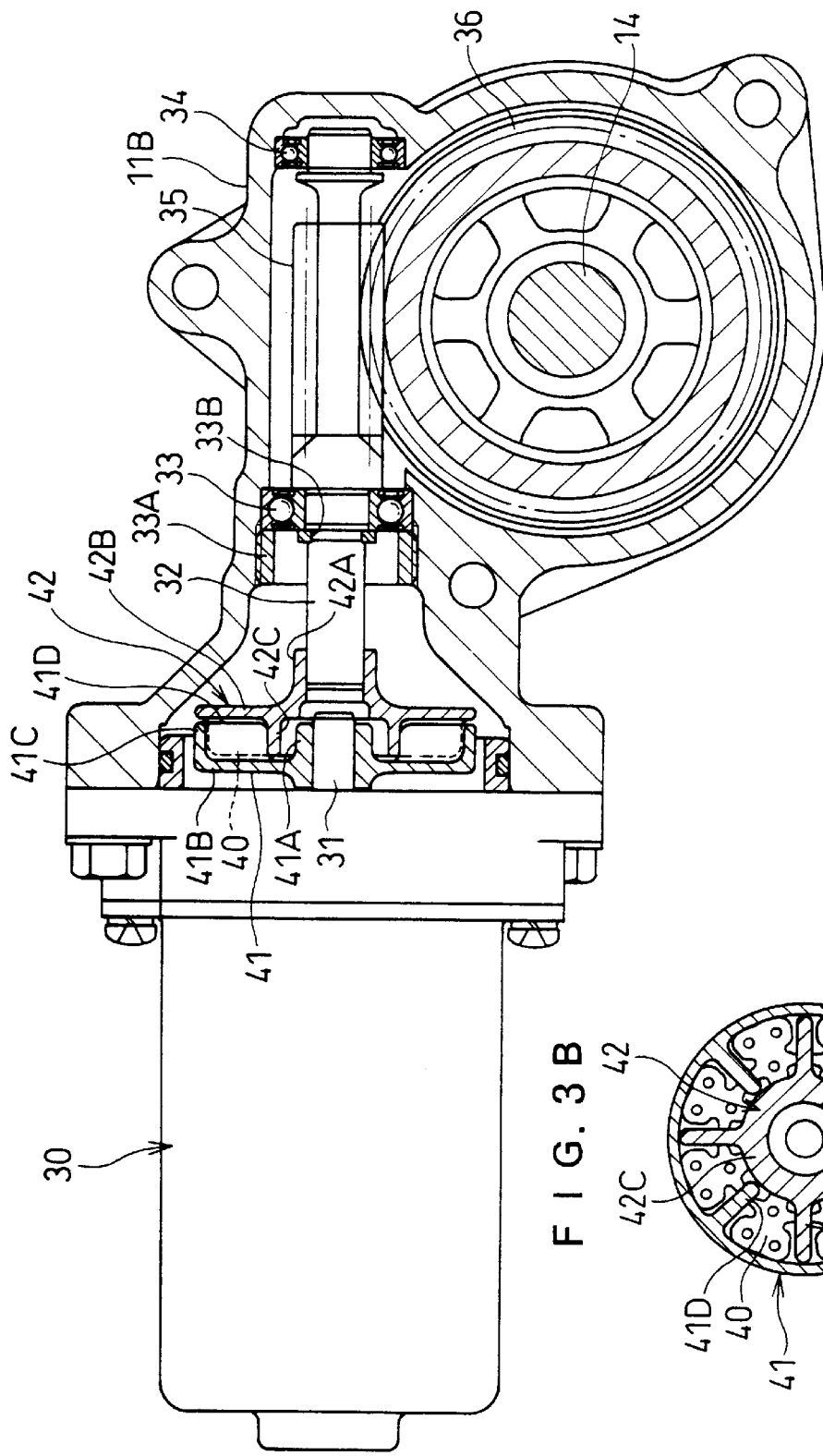
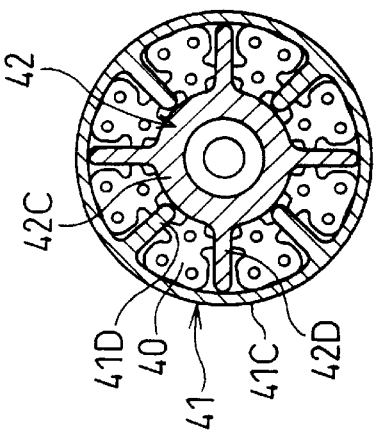
FIG. 3A
FIG. 3B

ELECTRIC POWER STEERING APPARATUS HAVING AN ELASTIC TORQUE TRANSMISSION BODY

BACKGROUND OF THE INVENTION

1. Field of the Invention

The present invention relates to an electric power steering apparatus.

2. Description of the Related Art

An electric power steering apparatus is structured such that a pinion shaft connected to a steering shaft is engaged with a rack shaft. A worm gear is provided in a drive shaft connected to an output shaft of an electric motor, and a worm wheel engaged with the worm gear is connected to the pinion shaft, whereby a torque of the motor is transmitted to the rack shaft to assist steering operation.

In the electric power steering apparatus, on respective tooth faces of the worm gear and the worm wheel, a proper backlash is set in view of requirement for working and operating. However, in the electric power steering apparatus, there is a case that a power transmitting direction is reversed due to operation of a steering wheel or a vibration input from a road surface. At a time of the reverse drive mentioned above, a tooth face at the back of the tooth face with which the worm gear or the worm wheel has been brought into contact suddenly moves to the extent of the backlash and collides with the opposing tooth face, whereby a striking sound is generated.

In the electric power steering apparatus, in the case that a stroke of the rack shaft is suddenly stopped such as when a tire rides over a curbstone during steering operation or other reasons, since the electric motor is going to continuously rotate due to inertia even when the electric motor stops supplying electric power, there is a risk that a propelling force of inertia of the electric motor damaging a torque transmission path.

SUMMARY OF THE INVENTION

An object of the present invention is to reduce a striking sound between tooth faces by reducing an impact force generated on the tooth faces of a gear provided in a torque transmission path of an electric motor, or to prevent the torque transmission path from being damaged due to a propelling force of inertia of the electric motor, in an electric power steering apparatus.

In accordance with the present invention, there is provided an electric power steering apparatus having a pinion shaft connected to a steering shaft, the pinion shaft being engaged with a rack shaft.

A drive gear is provided in a drive shaft connected to an output shaft of an electric motor and an intermediate gear is engaged with the drive gear, the intermediate gear being connected to the pinion shaft.

A torque transmission body made of an elastic body is interposed between the output shaft of the electric motor and the drive shaft.

BRIEF DESCRIPTION OF THE DRAWINGS

The present invention will be more fully understood from the detailed description given below and from the accompanying drawings which should not be taken to be a limitation on the invention, but are for explanation and understanding only.

FIGS. 3A and 3B show a placing structure of a torque transmission body, in which FIG. 3A is a cross sectional view along a line III—III in FIG. 2 and FIG. 3B is a cross sectional view of a main portion in FIG. 3A;

FIGS. 4A and 4B show a first rotational body, in which FIG. 4A is a front elevational view and FIG. 4B is a cross sectional view along a line B—B in FIG. 4A; and FIGS. 5A and 5B show a second rotational body, in which FIG. 5A is a front elevational view and FIG. 5B is a cross sectional view along a line B—B in FIG. 5A.

DESCRIPTION OF THE PREFERRED EMBODIMENTS

Figure 1:
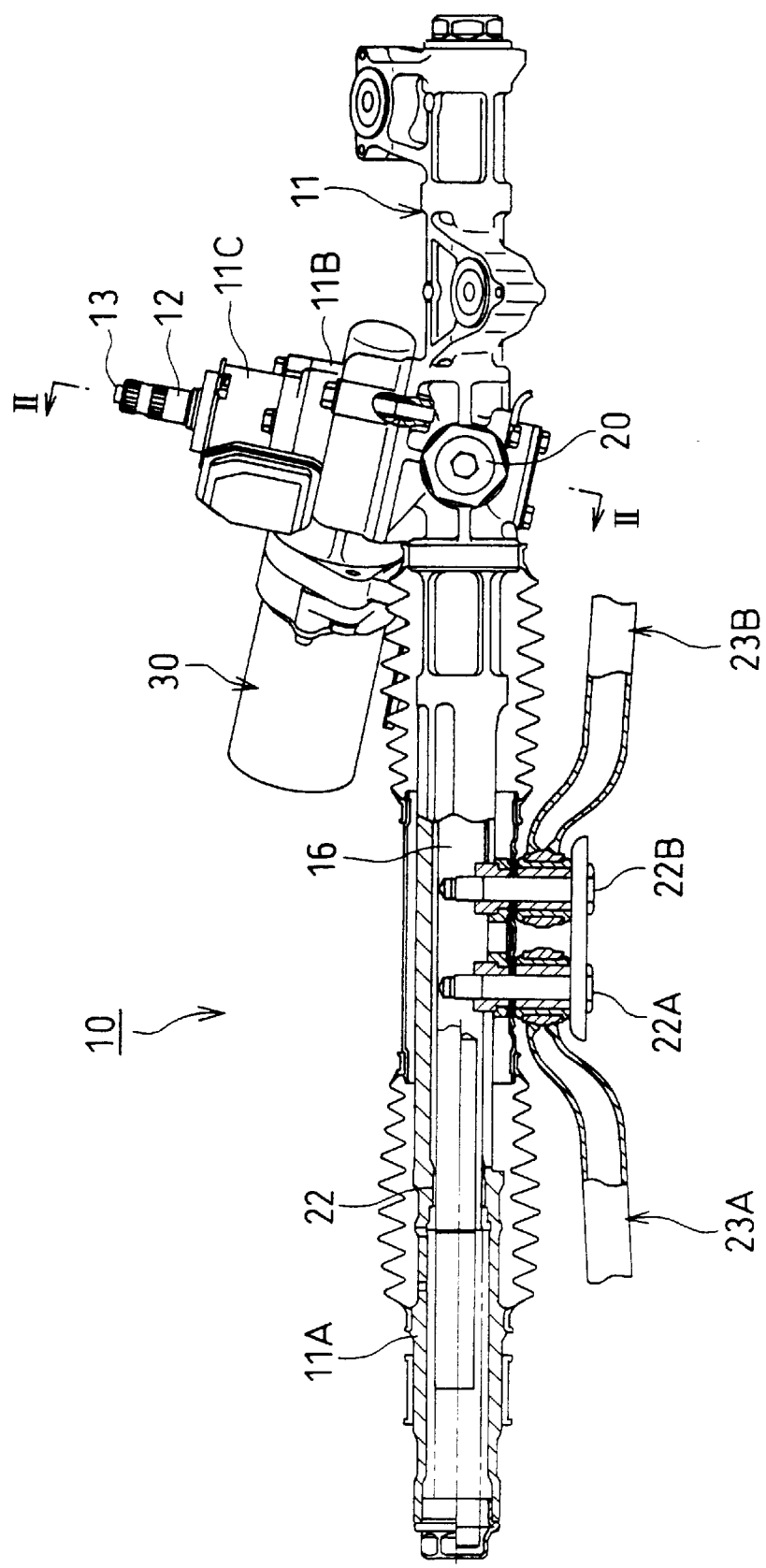
FIG. 1 is a front elevational view showing an electric power steering apparatus in a partly broken manner.
Figure 2:
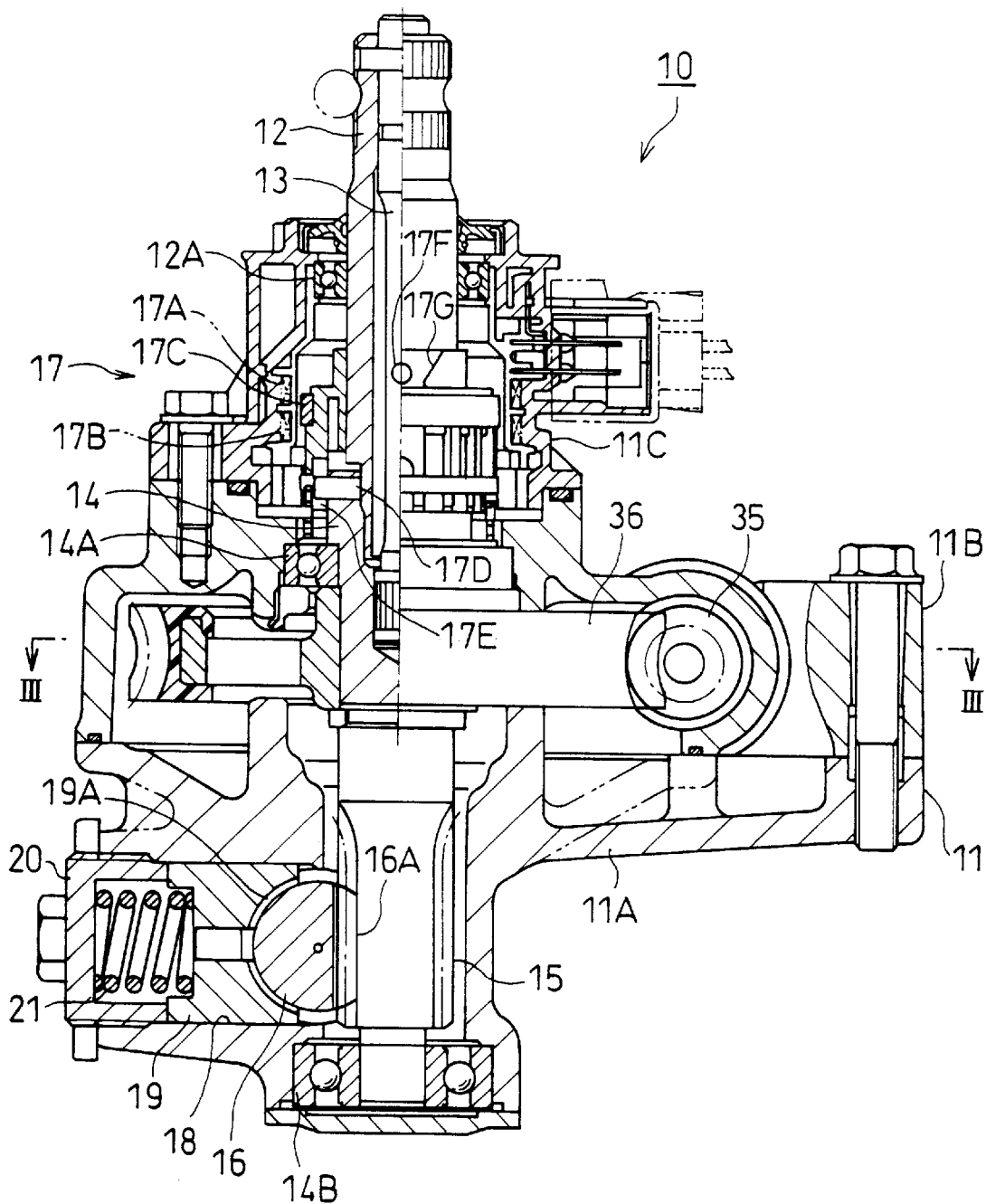
FIG. 2 is a cross sectional view along a line II—II in FIG. 1.

An electric power steering apparatus 10 has a housing 11 (first to third housings 11A to 11C) fixed to a vehicle body frame or the like by a bracket (not shown), as shown in FIGS. 1 and 2. The electric power steering apparatus 10 is structured such that a pinion shaft 14 is connected to a steering shaft 12 to which a steering wheel is connected, via a torsion bar 13. A pinion 15 is provided in the pinion shaft 14, and a rack shaft 16 provided with a rack 16A engaged with the pinion 15 is supported to the first housing 11A in such a manner as to freely move in a lateral direction. A steering torque detecting apparatus 17 is provided between the steering shaft 12 and the pinion shaft 14. In this case, the steering shaft 12 and the pinion shaft 14 are supported to the housing 11 via bearings 12A, 14A and 14B.

The steering torque detecting apparatus 17 is, as shown in FIG. 2, provided with two detecting coils 17A and 17B surrounding a cylindrical core 17C engaged with the steering shaft 12 and the pinion shaft 14 in the third housing 11C. The core 17C is provided with a vertical groove 17E engaging with a guide pin 17D of the pinion shaft 14 so as to freely move only in an axial direction, and is also provided with a spiral groove 17G engaging with a slider pin 17F of the steering shaft 12. Accordingly, when a steering torque applied to the steering wheel is applied to the steering shaft 12 and a relative displacement in a rotational direction is generated between the steering shaft 12 and the pinion shaft 14 due to an elastic torsional deformation of the torsion bar 13, the displacement in the rotational direction of the steering shaft 12 and the pinion shaft 14 causes to displace the core 17C in an axial direction, so that an inductance of the detecting coils 17A and 17B due to a magnetic change in the periphery of the detecting coils 17A and 17B generated by the displacement of the core 17C is changed. That is, when the core 17C moves to a side of the steering shaft 12, an inductance of the detecting coil 17A disposed in a side to which the core 17C moves is increased, and an inductance of the detecting coil 17B disposed in a side from which the core 17C moves apart is reduced, whereby it is possible to detect the steering torque due to the change of the inductance.

A rack guide 19 is installed, as shown in FIG. 2, in a cylinder portion 18 provided in a portion opposing to the pinion 15 with respect to one end of the rack shaft 16 within the first housing 11A. The rack guide 19 (a bush 19A) is elastically provided in a side of the rack shaft 16 by a spring 21 supported on a back surface by a cap 20 attached to the cylinder portion 18 so as to press the rack 16A of the rack shaft 16 to the pinion 15 and slidably support one end of the rack shaft 16. In this case, another end side of the rack shaft 16 is supported by a bearing 22. Further, right and left tie rods 23A and 23B are connected to an intermediate portion of the rack shaft 16 by connecting bolts 22A and 22B.

The second housing 11B supports an electric motor 30, as shown in FIG. 3. A drive shaft 32 is connected to an output shaft 31 of the electric motor 30, the drive shaft 32 is supported to the housing 11B by bearings 33 and 34 at both ends, and a worm gear (a drive gear) 35 is integrally provided in an intermediate portion of the drive shaft 32. A worm wheel 36 (an intermediate gear) engaging with the worm gear 35 is fixed to an intermediate portion of the pinion shaft 14. A generated torque of the electric motor 30 is applied as a steering assist force to the rack shaft 16 via an engagement between the worm gear 35 and the worm wheel 36 and an engagement between the pinion 15 and the rack 16A so as to assist steering force which a driver applies to the steering shaft 12. In this case, reference numerals 33A and 33B denote an outer wheel lock nut and an inner wheel stopper ring of the bearing 33, respectively.

In this case, in the electric power steering apparatus 10, as shown in FIG. 3, a torque transmission body 40 made of an elastic body is interposed between the output shaft 31 and the drive shaft 32 in the electric motor 30.

Figure 4A:
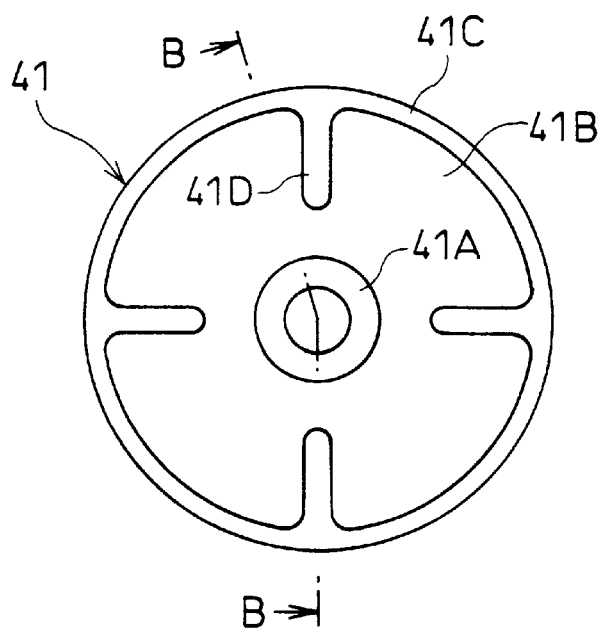
Figure 4B:
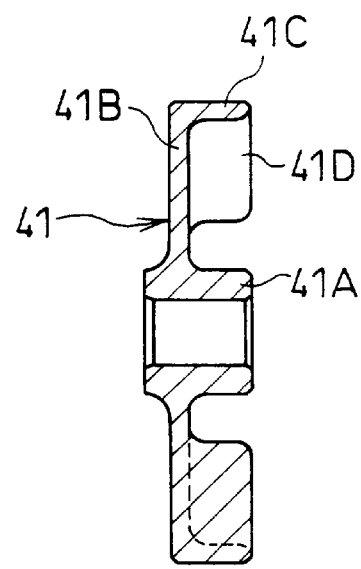
Figure 5A:
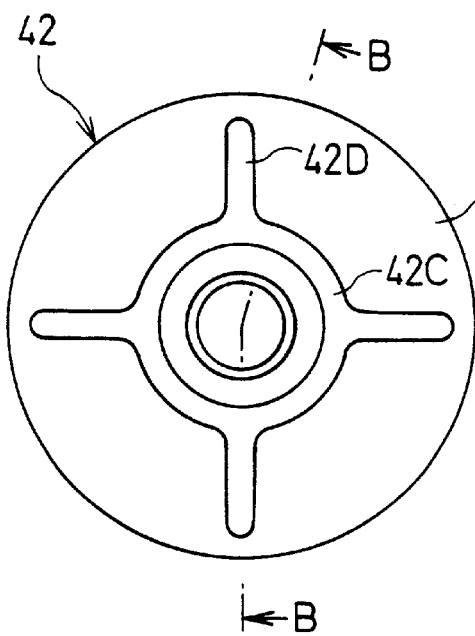
Figure 5B:
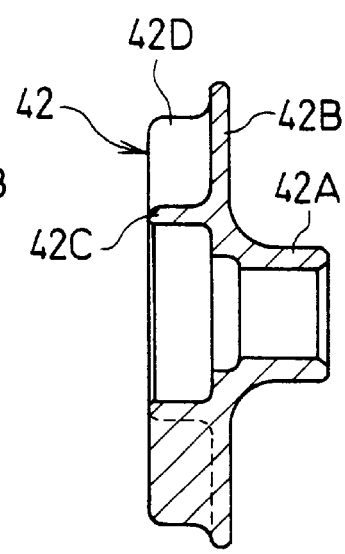

In particular, the structure is made such that a boss 41A of a first rotational body 41 (FIG. 4) is spline connected to the output shaft 31 of the electric motor 30 and a boss 42A of a second rotational body 42 (FIG. 5) is spline connected to the drive shaft 32. The first rotational body 41 is provided with supporting plates 41D at a plurality of positions (four positions in accordance with the present embodiment) in a rotational direction of a disc 41B and an outer peripheral flange 41C thereof. The second rotational body 42 is provided with supporting plates 42D at a plurality of positions (four positions in accordance with the present embodiment) in a rotational direction of a disc 42B and an inner peripheral flange 42C thereof. Each of a plurality of supporting plates 41D of the first rotational body 41 and each of a plurality of supporting plates 42D of the second rotational body 42 are alternately arranged in the rotational directions of both of the rotational bodies 41 and 42. The inner peripheral flange 42C of the second rotational body 42 is inserted into the outer peripheral flange 41C of the first rotational body 41 so that they oppose each other. One torque transmission body 40 is charged and interposed in between the supporting plates 41D and 42D opposing to each other in both rotational bodies 41 and 42 (totally eight portions in accordance with the present embodiment) with no gap.

The torque transmission body 40 is made of a rubber or the like, and is bonded to the disc 41B of the first rotational body 41 and the outer peripheral flange 41C (or the disc 42B of the second rotational body 42 and the inner peripheral flange 42C) by a baking operation or the like. The torque transmission body 40 may be bonded to both of the disc 41B of the first rotational body 41 and the outer peripheral flange 41C, and the disc 42B of the second rotational body 42 and the inner peripheral flange 42C by a baking operation or the like, or gripped between the first rotational body 41 and the second rotational body 42 without being bonded.

A description will be given below of operation of the electric power steering apparatus 10.

(1) When the steering torque detected by the steering torque detecting apparatus 17 is lower than a predetermined value, steering assist force is not required and the electric motor 30 is not driven.

(2) When the steering torque detected by the steering torque detecting apparatus 17 is over a predetermined value, the steering assist force is required, so that the electric motor 30 is driven. A generated torque of the electric motor 30 rotates the drive shaft 32 via the torque transmission body 40 from the output shaft 31 and is applied to the rack shaft 16 via the engagement between the worm gear 35 and the worm wheel 36, and the engagement between the pinion 15 and the rack 16A.

(3) When the worm gear 35 and the worm wheel 36 bring the tooth faces thereof into contact with each other due to backlash during reverse drive, in which a power transmitting direction is reversed due to a steering operation of the steering wheel or a vibration input from the road surface, an impact force generated between the worm gear 35 and the worm wheel 36 compresses and deforms the torque transmission body 40 mentioned above in the rotational direction of the first rotational body 41 and the second rotational body 42. Accordingly, the impact force generated on the tooth faces of the worm gear 35 is reduced due to elastic deformation of the torque transmission body 40, and the striking sound between the tooth faces is reduced.

(4) When the stroke of the rack shaft 16 is suddenly stopped such as when the tire rides over the curbstone during the steering operation of the steering wheel, the electric motor 30 is going to continuously rotate due to inertia even if the electric motor 30 stops being energized, whereby a propelling force of inertia is generated in the output shaft 31 of the electric motor 30. The propelling force of inertia compresses and deforms the torque transmission body 40 in the rotational direction of the first rotational body 41 and the second rotational body 42. Accordingly, the propelling force of inertia of the electric motor 30 is absorbed due to an elastic deformation of the torque transmission body 40, and the torque transmission path is prevented from being damaged.

Therefore, in accordance with the present embodiment, the following effects can be obtained.

(1) In the case that an excessive propelling force is applied to the torque transmission path of the electric motor 30 at a time when the electric power steering apparatus 10 is reverse driven, such as when a tire rides over a curbstone or the like, the torque transmission body 40 interposed between the output shaft 31 of the electric motor 30 and the drive shaft 32 of the worm gear 35 and made of the elastic body is compressed and deformed, thereby absorbing an impact force caused by the excessive propelling force mentioned above. Accordingly, it is possible to reduce the impact force generated on the tooth faces of the worm gear 35 so as to reduce the striking sound between the tooth faces, or prevent the torque transmission path from being damaged, due to the propelling force of inertia of the electric motor 30.

(2) In comparison with a clutch which is interposed between the output shaft 31 of the electric motor 30 and the drive shaft 32 of the worm gear 35, which starts sliding at a torque equal to or more than a fixed amount, the torque transmission body 40 in accordance with the present invention has an elasticity at a fine initial torque transmitting stage and has a higher impact force absorbing performance mentioned in the item (1).

(3) Each of a plurality of supporting plates 41D provided in the first rotational body 41 and each of a plurality of supporting plates 42D provided in the second rotational body 42 are alternately arranged in the rotational directions of both of the rotational bodies 41 and 42 and are opposed to each other. The torque transmission body 40 is interposed between the supporting plates 41D and 42D opposed to each other in both of the rotational bodies 41 and 42. Accordingly, in any of rightward and leftward rotations of the electric motor 30 together with the rightward and leftward steering, it is possible to securely compress and deform the torque transmission body 40 between the output shaft 31 of the electric motor 30 and the drive shaft 32 of the worm gear 35, and it is possible to secure the impact force absorbing performance mentioned in the item (1).

In this case, in the electric power steering apparatus 10, the structure may be made such that a clutch which starts sliding due to a torque equal to or more than a fixed amount is used in the electric motor 30 together with the torque transmission body 40 mentioned above. The clutch can be interposed between the output shaft 31 of the electric motor 30 and the first rotational body 41 or between the second rotational body 42 and the drive shaft 32.

As heretofore explained, embodiments of the present invention have been described in detail with reference to the drawings. However, the specific configurations of the present invention are not limited to the embodiments but those having a modification of the design within the range of the present invention are also included in the present invention. For example, in the electric power steering apparatus to which the present invention is applied, the drive gear and the intermediate gear are not limited to the structure constituting a worm reduction gear, and may be constituted by the other gears for generating a propelling force in the drive shaft, for example, a helical gear, a bevel gear and the like.

As mentioned above, in accordance with the present invention, in the electric power steering apparatus, it is possible to reduce the striking sound between the tooth faces by reducing the impact force generated on the tooth faces of the gear provided in the torque transmission path of the electric motor, or prevent the torque transmission path from being damaged, due to the propelling force of inertia of the electric motor.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. An electric power steering apparatus comprising a pinion shaft connected to a steering shaft, the pinion shaft being engaged with a rack shaft; a drive gear provided in a drive shaft connected to an output shaft of an electric motor; and an intermediate gear engaged with said drive gear, the intermediate gear being connected to said pinion shaft, wherein, a torque transmission body made of an elastic body is interposed between the output shaft of the electric motor and said drive shaft, wherein a first rotational body is provided in a side of the output shaft of said electric motor, a second rotational body being provided in a side of said drive shaft, a plurality of first supporting plates are arranged in the first rotational body and a plurality of second supporting plates are arranged in the second rotational body, the plurality of supporting plates in the first and second rotational bodies being alternately arranged in a rotational direction of both of the rotational bodies and opposed to each other, and the torque transmission body being interposed between the supporting plates opposed to each other in both of the rotational bodies.

2. An electric power steering apparatus as claimed in claim 1, wherein said first rotational body is provided with said first supporting plates at a plurality of positions in the rotational direction of a first disc and an outer peripheral flange, said second rotational body being provided with said second supporting plates at a plurality of positions in the rotational direction of a second disc and an inner peripheral flange, the inner peripheral flange of the second rotational body being inserted into the outer peripheral flange of the first rotational body, each of the plurality of first supporting plates in the first rotational body and each of the plurality of second supporting plates in the second rotational body being alternately arranged in the rotational direction of both the rotational bodies and being opposed to each other, the torque transmission body being interposed between the supporting plates opposing to each other in both of the rotational bodies with no gap.

3. An electric power steering apparatus as claimed in claim 2, wherein said torque transmission body is made of an elastic material, and is bonded to the first disc and the outer peripheral flange in said first rotational body or the second disc and the inner peripheral flange in the second rotational body by a baking operation.

4. An electric power steering apparatus as claimed in claim 2, wherein said torque transmission body is made of an elastic material, and is bonded to both the first disc and the outer peripheral flange in the first rotational body, and the second disc and the inner peripheral flange in the second rotational body by a baking operation.

5. An electric power steering apparatus as claimed in claim 2, wherein said torque transmission body is made of an elastic material, and is held between said first rotational body and said second rotational body without being bonded.

* * * * *